Aug. 15, 1967  G. W. CHENEY  3,336,424

THERMOPLASTIC SHEET FORMATION

Filed Oct. 2, 1963  3 Sheets-Sheet 1

INVENTOR.
GRANT W. CHENEY
BY
Dominik Rudy & Stein
Jerome Rudy  ATT'YS.

INVENTOR.
GRANT W. CHENEY

United States Patent Office 3,336,424
Patented Aug. 15, 1967

3,336,424
THERMOPLASTIC SHEET FORMATION
Grant W. Cheney, Midland, Mich., assignor to The Dow Chemical Company, Midland, Mich., a corporation of Delaware
Filed Oct. 2, 1963, Ser. No. 313,383
8 Claims. (Cl. 264—89)

This invention relates to a method and apparatus for the formation of thermoplastic sheet into containers, and more particularly, cup-like containers.

It is, of course known to form a cup-like container from a heated thermoplastic sheet material by mechanically forcing the material into a die cavity by use of a mandrel, following which the material is expanded by pressure fluid into contact with the walls of the cavity. The cup-like container so formed is trimmed about its lip portion either prior to, or after removal from the die cavity.

While some of such known methods and apparatus have produced satisfactory containers, most require a high degree of adjustment, and production under carefully controlled conditions. One problem encountered is the obtainment of uniform wall thickness in the container. An underlying cause which contributes to such problem, is the fact that once any portion of the material engages the mandrel and/or the walls of the die cavity, it has a tendency to stick thereto, which action prevents further stretching of the material so engaged. Consequently, the material which is last engaged by the mandrel or die cavity is stretched more than the material which has prior engagement therewith. As a result, a cup of non-uniform wall thickness is produced which lacks high strength qualities, and is often of unattractive appearance.

The method and apparatus of the invention will be founr to produce thermoplastic cups of uniform wall thickness and of attractive appearance. Briefly, the inventive concept is founded upon a controlled stretching of the thermoplastic material prior to being forced into contact with the cup shaping recess of the molding cavity. Such stretching is accomplished by placing a sheet of heated thermoplastic material in contact with a porous metal disc, creating a pressure differential on the sheet to urge it into tight engagement with the disc, and applying compressed air to the sheet to peel the sheet away from the disc, such peeling action proceeding radially inward on the disc, and forcing the material into engagement with the walls of a recess in the cavity. The material assumes a billowing form as it is peeled from the disc, which causes a controlled stretching of the material prior to contact with the walls of the recess. In such manner, the center portion of the sheet material will be stretched proportionately less, thereby producing a finished cup with less thinning at the bottom, or in other words, a cup having uniform thickness walls. The method and apparatus of the invention may be utilized in high quality and high quantity production operations.

The main object of this invention is to provide an improved method and apparatus for the production of containers made from thermoplastic sheet material.

A specific object of this invention is to provide a method and apparatus which will produce thermoplastic cup-like containers of improved strength and attractive appearance.

A more specific object is to provide a method and apparatus for production of uniform-thickness thermoplastic cup-like containers.

Another object is to provide a method and apparatus for the formation of cup-like thermoplastic containers of high quality, and which allow high quantity production.

These and further objects and features of the invention will become more apparent from the following description and accompanying drawings wherein.

Figure 1:
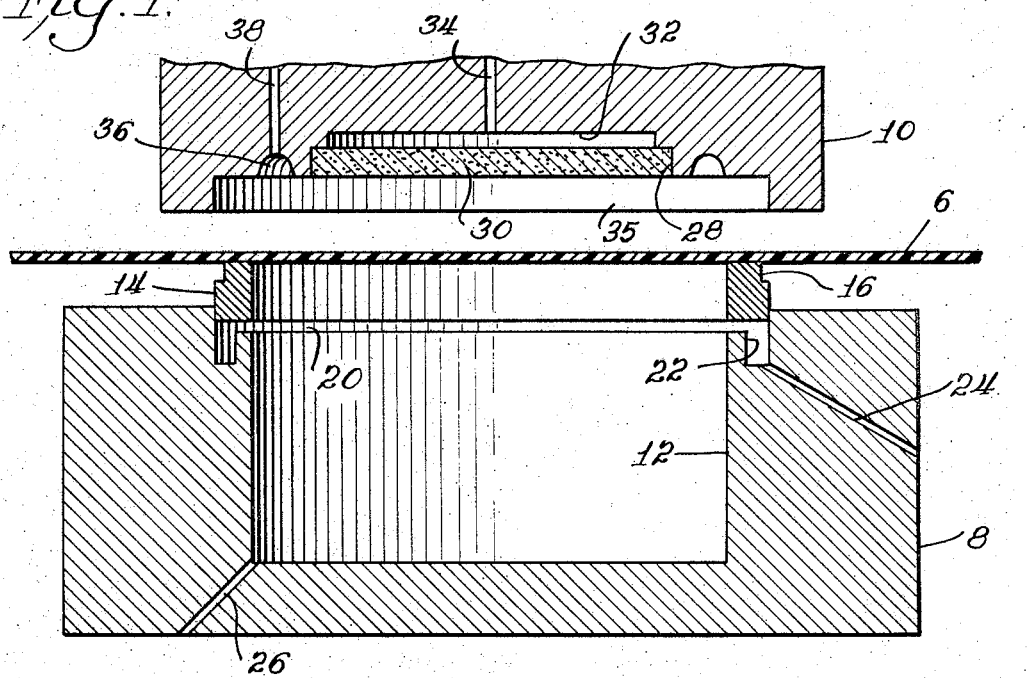
FIG. 1 is a vertical section view of apparatus illustrative of an embodiment of the invention and showing an initial phase operation.

Referring now to the drawings and more particularly to FIG. 1, a sheet of thermoplastic material 6 in pliable condition, as induced by heating, is shown in position between a mold cavity 8 and a mold top 10. The mold cavity 8 has a forming recess 12 of such configuration as to provide the desired shape of a container to be formed therein. A circular clamp and trim ring 14 is positioned at the upper end of the recess 12, which ring has a peripheral undercut 16 adapted to form a downwardly extending lip 18 of a container to be made in the mold cavity. A circumferential vent slot 20 may be provided near the upper end of the forming recess 12, which slot is defined in part by the lower surface of the trim ring 14 and a relief groove 22 formed in the mold cavity. The relief groove 22 is vented by means of one or more passageways 24. Secondary vent means are provided in the form of one or more passageways 26 arranged in the lower end of the mold cavity 8.

Figure 2:
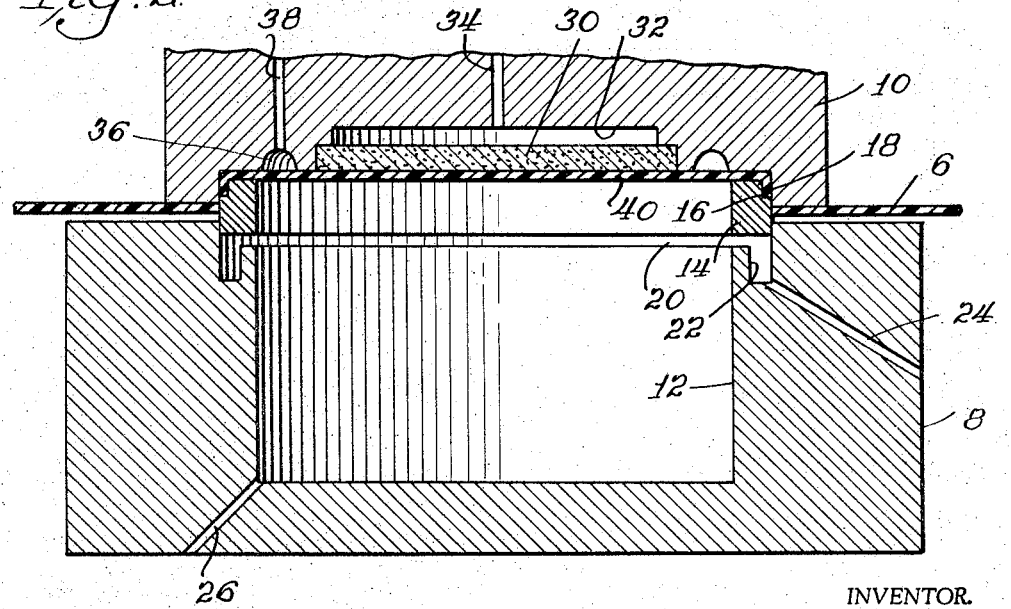
FIG. 2 is the same but showing a sheet of thermoplastic material after edge forming and prior to a stretching operation.

The mold top 10 is formed with a disc-like recess 35 on the lower surface, the diameter of which provides a sliding fit over the major diameter of the trim ring 14, as seen in FIG. 2, whereby the sheet material 6 is sheared. A second disc-like recess 28 is arranged in the mold top for receipt of an air pervious means in the form of a porous metal disc 30. Means (not shown) are provided to maintain a given temperature of the sheet. The upper surface of the disc 30 is exposed to a recess 32 which is almost of equivalent area to the disc 30 and is connected to a sub-atmospheric pressure source (not shown) via one or more passageways 34. Recess 35 is connected to a super-atmospheric pressure source (not shown) via a circular recess 36 having one or more passageways 38 opening thereinto.

Operation of the apparatus above described is as follows. The sheet material is heated to a moldable condition and is then placed in contact with the top surface of the ring 14, following which the mold top 10 is moved downwardly. Such action results in the severing of a circular portion 40 of material from the sheet 6, which portion is clamped between the upper surface of the ring 14 and an end region of the base surface of the recess 35. An edge region of the cut material 40 will be bent downwardly into engagement with the undercut 16 of the ring 14, to form the container lip 18. A pressure differential acting on the material 40 by reason of the sub-atmospheric (vacuum) pressure on the upper surface and atmospheric pressure on the lower surface, will cause the material to tightly engage the porous disc 30.

Figure 3:
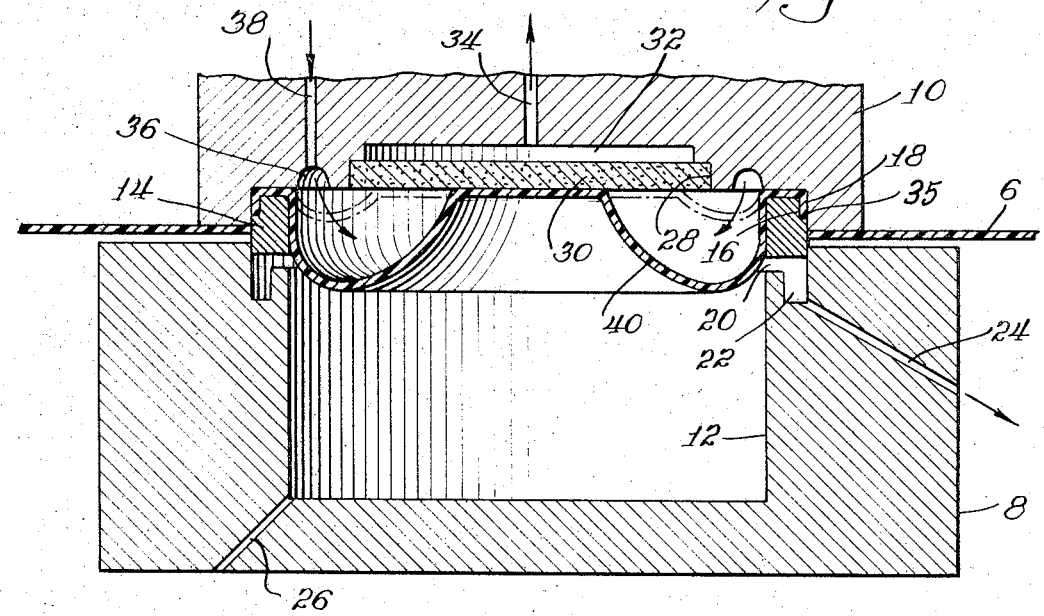
FIG. 3 is the same but showing the sheet material in an early phase of stretching.

Next, compressed air is fed into the recess 36 via the passageways 38, while vacuum condition is still maintained above the material 40. As a result, the material 40 will be peeled off of the disc 30 and be made to billow downwardly as it is peeled inwardly toward the center of the disc 30, as illustrated in FIG. 3. Such action will cause the material to be stretched as it is forced into engagement with the wall of the forming recess 12. By controlling the holding effect of the material upon the disc, the material will billow and peel off the disc at a rate which will require the center portion of the material to stretch less, thereby eventually producing a finished container with less thinning at the bottom than is possible with more conventional methods of vacuum forming such containers.

Figure 4:
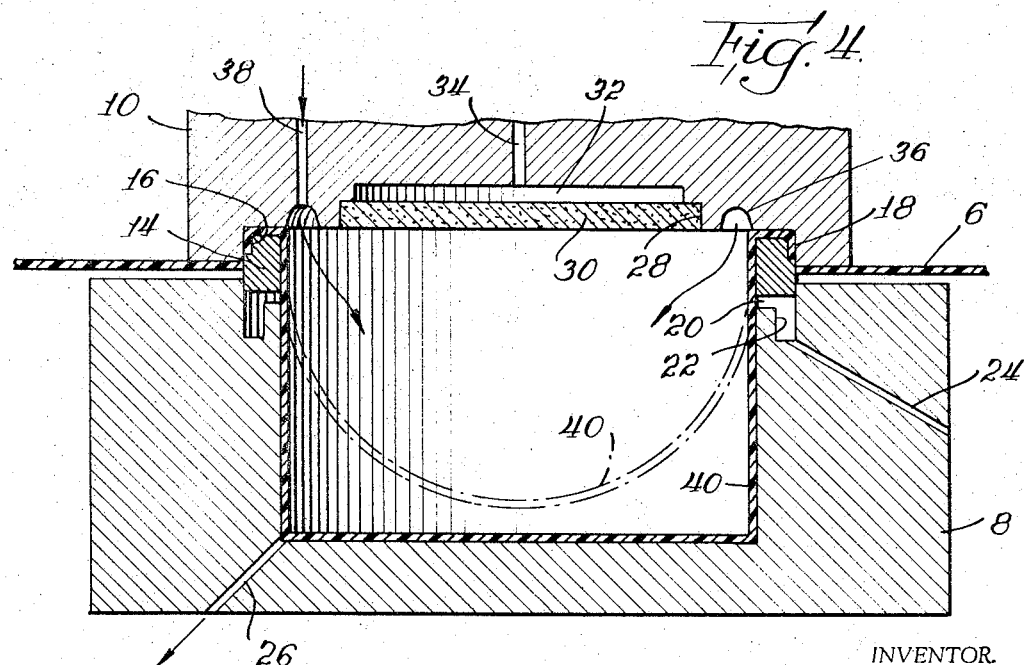
FIG. 4 is the same but showing the sheet material after it has been fully formed into a cup-like container.

In FIG. 4 is shown the material 40 in full engagement with the forming recess 12, thus providing a finished cup-like container with a downwardly projecting lip portion 18. The finished container may be removed from the recess in any one of several ways, such as by ejector pins (not shown) or by application of compressed air to the passageways 26.

It may be mentioned in passing that the molding operation may be coupled with a sheet material extruding operation. In other words, the material may be taken directly from an extruder, while still warm enough to be readily moldable, and passed to the molding apparatus which will form the cup-like container. Also, more than one molding station may be simultaneously operated.

The method and apparatus above described will produce finished cup-like containers in a rapid manner, which containers may be made with uniform wall thickness, a factor which contributes greatly to strength as well as attractive appearance.

While a uniform thickness and material distribution disc 30 has been illustrated, it may be desirable under certain conditions to form the disc so that its porosity is varied. For example, the porosity distribution may be made to increase toward the center area of the disc, thus providing greater holding effect toward the center. Alternatively, the disc may be formed with annular porous segments which would permit variation in area of vacuum exposure. While it could happen that a certain amount of incoming air from the recess 36 would seep through the disc 30 to dilute the vacuum effect, such action would be compensated by the increase in pressure below the material as it is moved downwardly in the molding recess. By proper design of die cavity gometry, including venting provisions as well as disc porosity, the pressure differential acting upon the material remaining in contact with the disc can be effectively maintained.

Figure 5:
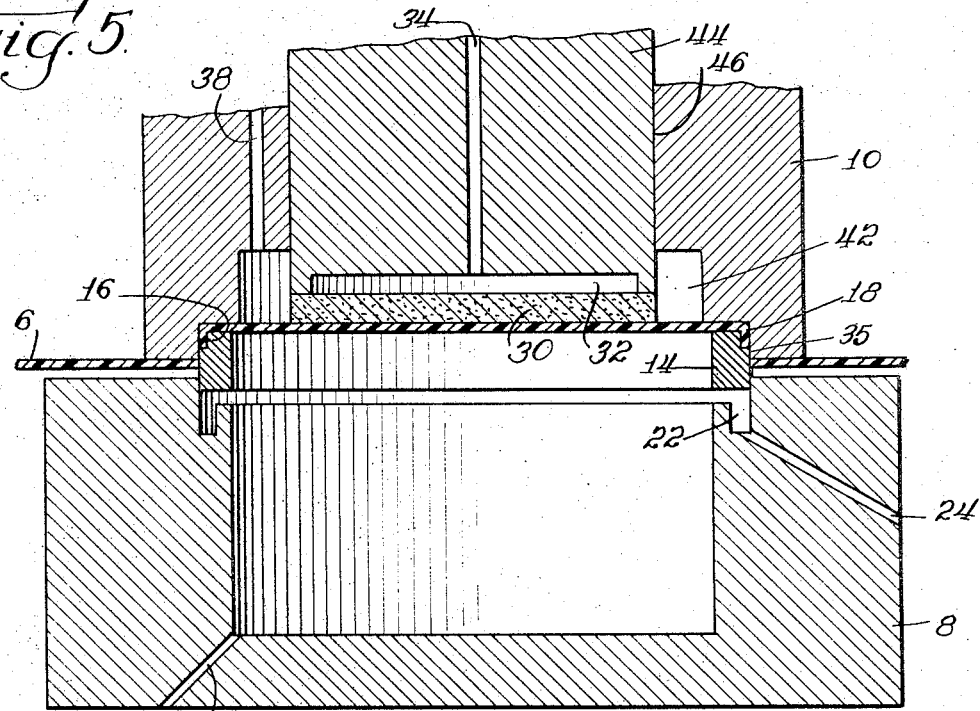
FIG. 5 is a modified embodiment of the invention showing sheet material is an early phase of stretching.
Figure 6:
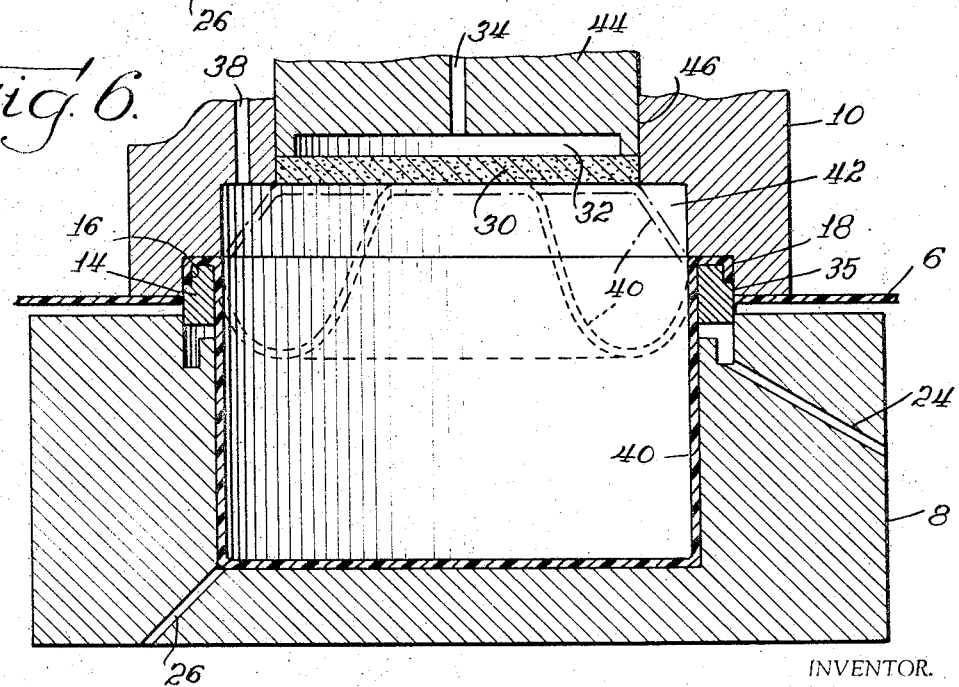
FIG. 6 is the same but showing the sheet material after it has been fully formed into a cup-like container.

The modified embodiment of the invention illustrated in FIGS. 5 and 6, is similar to that disclosed above, and parts in common between the two embodiments will be identified by the same part numbers. Actually, the second embodiment differs structurally from the first, primarily in the arrangement of the porous disc member 30. As seen in FIG. 5, an enlarged recess 42 is provided which is connected to a super-atmospheric pressure source (not shown) by one or more passageways 38. A piston 44 is slidably mounted in an opening 46 formed in the mold top 10 for reciprocal movement in the recess 42. The porous disc 30, affixed to the lower extremity of the piston, encloses the recess 32 provided in the end of the piston. The recess 32 is connected to a source of sub-atmospheric pressure (not shown) via passageways 34.

In operation of the modified embodiment, the piston 44 is lowered in the recess so that the surface of the porous disc 30 engages the sheet of thermoplastic material 6, as seen in FIG. 5. The upper surface of the porous disc is then exposed to a vacuum, thus creating a pressure differential on the material 6 to maintain it in tight engagement with the porous disc. The piston 44 is then moved upwardly causing a stretching of the material in the region of the disc periphery as seen in broken lines in FIG. 6. Pressurized air is then admitted to the recess 42 via the passageways 38 to cause a peeling off of the material from the disc, as seen in dotted lines in FIG. 6. The remainder of the forming operation then proceeds as explained in connection with the first described embodiment. It will be apparent that the second embodiment as illustrated in FIGS. 5 and 6 differs primarily from the first described embodiment by causing greater stretching of the material which forms the upper portion of the container made in the apparatus according to the principles of the invention.

It will be apparent from the foregoing that the method and apparatus will satisfy all of the objectives of the invention set forth hereinbefore.

The foregoing description was given in detail and without thought of limitation since the inventive principles involved are capable of assuming other forms without departing from the spirit of the invention or the scope of the following claims.

What is claimed is:

1. A method for forming thermoplastic sheet material into a given shape comprising the steps of, arranging a moldable sheet of thermoplastic material above a mold cavity, placing an air pervious means adjacent an upper surface of the material, applying a first pressure differential to the material to force it into engagement with the air pervious means, and applying a second pressure differential, while maintaining said first pressure differential, to the sheet material to peel it away from engagement with the air pervious means, in a direction progressing radially inward, to force the material into full engagement with a recess formed in the mold cavity.

2. A method for forming thermoplastic sheet material into a given shape comprising the steps of, arranging a moldable sheet of thermoplastic material above a mold cavity, holding the sheet material in engagement with a porous disc, applying a first pressure differential to the material to force it into engagement with a porous disc, and applying a second pressure differential to the sheet material, while maintaining said first pressure differential, to peel the material away from engagement with the porous disc, in a direction progressing radially inward of the porous disc, to force the material into full engagement with a recess formed in the mold cavity.

3. A method of forming thermoplastic sheet material into a cup-like shape comprising the steps of, arranging a moldable sheet of thermoplastic material above a mold cavity, peripherally shearing the sheet material, holding the sheared material in engagement with a porous disc, applying a first pressure differential to the material to force it into engagement with the porous disc, and applying a second pressure differential to the sheet material, while maintaining said first pressure differential, to peel the material away from engagement with the porous disc in a direction progressing radially inward of the porous disc, to force the material into full engagement with a recess formed in the mold cavity.

4. A method of forming thermoplastic sheet material into a cup-like shape comprising the steps of, heating the sheet material to make it moldable, arranging the heated material above a mold cavity, peripherally shearing the sheet material, holding the sheared material in engagement with a porous disc, applying a first pressure differential to the material to force it into engagement with the porous disc, and applying a second pressure differential to the material while maintaining said first pressure differential, to peel and billow the material away from the porous disc in a direction progressing radially inward of the porous disc, to ultimately force the material away from engagement with the porous disc and into full engagement with a recess formed in the mold cavity.

5. Apparatus for forming thermoplastic sheet material into a container comprising, a mold cavity having a container forming recess, a clamp and trim ring mounted on the mold cavity and surrounding said recess, said ring being adapted for shearing thermoplastic sheet material, a mold top movable relative to the mold cavity, said mold top adapted in cooperation with the ring to hold the sheared material in fixed position above the recess, and an air pervious means suppported in the mold top for engagement by the sheared material, said mold top being formed to apply a sub-atmospheric pressure to an upper side of the air pervious means to force said material into engagement with said air pervious means, and being further formed to apply a super-atmospheric pressure to the sheet material, while maintaining said subatmospheric pressure, to force it away from contact with the air pervious means and into the recess.

6. Apparatus for forming thermoplastic sheet material into a container comprising, a mold cavity having a container forming recess, a clamp and trim ring mounted on the mold cavity and surrounding said recess, said ring being adapted for shearing thermoplastic sheet material, a mold top movable relative to the mold cavity and having a disc-like recess with a side wall providing a sliding fit over the side of the ring, said mold top adapted in co-operation with the ring to hold the sheared material in fixed position above the recess, and a porous disc supported in the mold top for engagement by the sheared material, said mold top being formed with a passageway arranged to connect the top surface of the porous disc with a source of sub-atmospheric pressure, said mold top being further formed with a passageway arranged to connect the disc-like recess with a source of super-atmospheric pressure to cause the sheet material to be forced away from contact with the porous disc and into the recess.

7. Apparatus according to claim 6, wherein said mold cavity is formed with passageway means to vent the mold recess.

8. Apparatus according to claim 7, wherein said trim ring has a peripheral undercut allowing the sheared material to be forced therein by the mold top disc-like recess to form a downwardly extending lip about the top edge of the container.

References Cited

UNITED STATES PATENTS

| 2,702,411 | 2/1955 | Winstead | 264—92 X |
| 2,983,955 | 5/1961 | Gajdosik | 264—93 |
| 2,990,581 | 7/1961 | Rowe | 264—92 X |
| 3,218,379 | 11/1965 | Edwards | 264—93 |

ROBERT F. WHITE, *Primary Examiner.*

A. R. NOE, *Assistant Examiner.*